US008190295B1

(12) United States Patent　(10) Patent No.:　US 8,190,295 B1
Garretson et al.　(45) Date of Patent:　May 29, 2012

(54) APPARATUS AND METHOD FOR MODIFYING THE OPERATION OF A ROBOTIC VEHICLE IN A REAL ENVIRONMENT, TO EMULATE THE OPERATION OF THE ROBOTIC VEHICLE OPERATING IN A MIXED REALITY ENVIRONMENT

(75) Inventors: Justin R. Garretson, Albuquerque, NM (US); Eric P. Parker, Albuquerque, NM (US); T. Scott Gladwell, Albuquerque, NM (US); J. Brian Rigdon, Edgewood, NM (US); Fred J. Oppel, III, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 490 days.

(21) Appl. No.: 12/433,347

(22) Filed: Apr. 30, 2009

Related U.S. Application Data

(60) Provisional application No. 61/053,043, filed on May 14, 2008.

(51) Int. Cl.
*G06F 19/00* (2011.01)
(52) U.S. Cl. ...................................... 700/245
(58) Field of Classification Search .............. 701/23, 701/300–302; 700/245, 253, 255, 258, 259
See application file for complete search history.

(56) References Cited

U.S. PATENT DOCUMENTS

| 6,826,452 | B1* | 11/2004 | Holland et al. ............ 700/245 |
| 7,200,536 | B2 | 4/2007 | Wynn |
| 7,243,053 | B1 | 7/2007 | Small |
| 7,246,050 | B2 | 7/2007 | Sheridan |
| 8,019,447 | B2* | 9/2011 | Hoisington et al. ........... 700/31 |
| 2005/0131580 | A1* | 6/2005 | Kurzweil ...................... 700/245 |
| 2009/0276105 | A1* | 11/2009 | Lacaze et al. ..................... 701/2 |
| 2010/0017026 | A1* | 1/2010 | Fletcher et al. ............... 700/245 |

OTHER PUBLICATIONS

Choi, W., et al., Study on L-V-C(Live-Virtual-Constructive) Interoperation for the National Defense M&S (Modeling & Simulation), Proceedings of: ICISS 2008: 2008 International Conference on Information Science and Security (2008), pp. 128-133.
Dean, F.S., et al., "Mixed Reality: A Tool for Integrating Live, Virtual & Constructive Domains to Support Training Transformation", Proceedings of I/ITSEC2004, Interservice/Industry Training, simulation, and Education Conference, Orlando, FL, Dec. 2004.
Karr, C.R., et al., "Synthetic Soldiers", IEEE Spectrum (Mar. 1997) vol. 34, Issue 3, pp. 39-45.

* cited by examiner

*Primary Examiner* — James Trammell
*Assistant Examiner* — Michael D Lang
(74) *Attorney, Agent, or Firm* — Olivia J. Tsai

(57) ABSTRACT

Apparatus and methods for modifying the operation of a robotic vehicle in a real environment to emulate the operation of the robotic vehicle in a mixed reality environment include a vehicle sensing system having a communications module attached to the robotic vehicle for communicating operating parameters related to the robotic vehicle in a real environment to a simulation controller for simulating the operation of the robotic vehicle in a mixed (live, virtual and constructive) environment wherein the affects of virtual and constructive entities on the operation of the robotic vehicle (and vice versa) are simulated. These effects are communicated to the vehicle sensing system which generates a modified control command for the robotic vehicle including the effects of virtual and constructive entities, causing the robot in the real environment to behave as if virtual and constructive entities existed in the real environment.

22 Claims, 3 Drawing Sheets

APPARATUS AND METHOD FOR MODIFYING THE OPERATION OF A ROBOTIC VEHICLE IN A REAL ENVIRONMENT, TO EMULATE THE OPERATION OF THE ROBOTIC VEHICLE OPERATING IN A MIXED REALITY ENVIRONMENT

RELATED APPLICATIONS

This application claims the benefit of U.S. Provisional Application No. 61/053,043 filed on May 14, 2008, the entirety of which is herein incorporated by reference.

STATEMENT REGARDING FEDERALLY SPONSORED RESEARCH OR DEVELOPMENT

The United States Government has certain rights in this invention pursuant to Department of Energy Contract No. DE-AC04-94AL85000 with Sandia Corporation.

FIELD OF THE INVENTION

The invention generally relates to apparatus and methods for controlling the operation of a robotic vehicle operating in a live environment, to emulate the operation of the robotic vehicle in a live-virtual-constructive, mixed reality environment. The apparatus and methods allow emulating the operation of the robotic vehicle interacting with live, virtual and constructive entities, within the mixed reality environment. The apparatus and methods provide for operator training, test and evaluation of the robotic vehicle operating within the mixed reality environment.

BACKGROUND OF THE INVENTION

The evolving requirements of security force and military planners require the ability to perform testing an experimentation involving interactions between live, virtual and constructive entities. Live entities can include a real piece of hardware being tested or trained upon, for example robotic vehicles that can have human operators, operating in a live (e.g. real) environment. Virtual entities can include a human or other live asset brought into a mixed reality environment through the use of a camera by a virtual presence. Another example of a virtual entity can include data from a simulator with a human operator. Constructive entities can include for example, data from a simulator representing purely simulated entities, such as constructed representations of environmental obstacles (e.g. terrain & atmospheric features) buildings, and the simulated presence of humans, and other vehicles. A requirement for high fidelity testing and experimentation is the ability to tightly couple the robotic vehicle and the simulations through apparatus and methods that provide for the simulation data to directly impact the control loop of the robotic vehicle. Likewise, the performance of the robotic vehicle needs to directly impact the simulation in such a way as to influence and change the simulations performance. Apparatus and methods according to the present invention meet these needs by providing an ability to insert the effects of virtual and constructive entities interacting with the robotic vehicle in a mixed reality environment, into the control loop of the live robotic vehicle operating in a real environment. The integration of live, virtual and constructive data into the control loop of the live robotic vehicle, causes the operation of the robotic vehicle in the live environment to emulate the operation of the robotic vehicle in the mixed reality (live-virtual-constructive) environment. As a simplistic example, if the robotic vehicle were to encounter a virtual or constructive representation of an obstacle in the mixed reality environment, the robotic vehicle in the live environment would emulate the encounter of the vehicle with the obstacle. In an exemplary application, the apparatus and methods of the present invention provide the ability to evaluate a robotic vehicles capability to achieve its mission objectives in a mixed reality environment, where it can otherwise be impractical to assemble all the required interacting entities in a live situation.

BRIEF DESCRIPTION OF THE DRAWINGS

The accompanying drawings, which are incorporated in and form part of the specification, illustrate several embodiments of the present invention and, together with the description, serve to explain the principles of the invention. The drawings provided herein are not drawn to scale.

DETAILED DESCRIPTION OF THE INVENTION

A robotic vehicle of interest for operator training, test and/or evaluation will typically include a mobile platform and a control system for controlling the mobile platform. A platform can for example include wheels, tracks and/or legs to provide terrestrial mobility of the robotic vehicle, fins and/or propellers for aquatic mobility and/or jets, propellers and rotors for aerial mobility. The control system coupled to the platform can include for example, motor controllers for controlling the drive systems providing the mobility to the platform.

Figure 1:
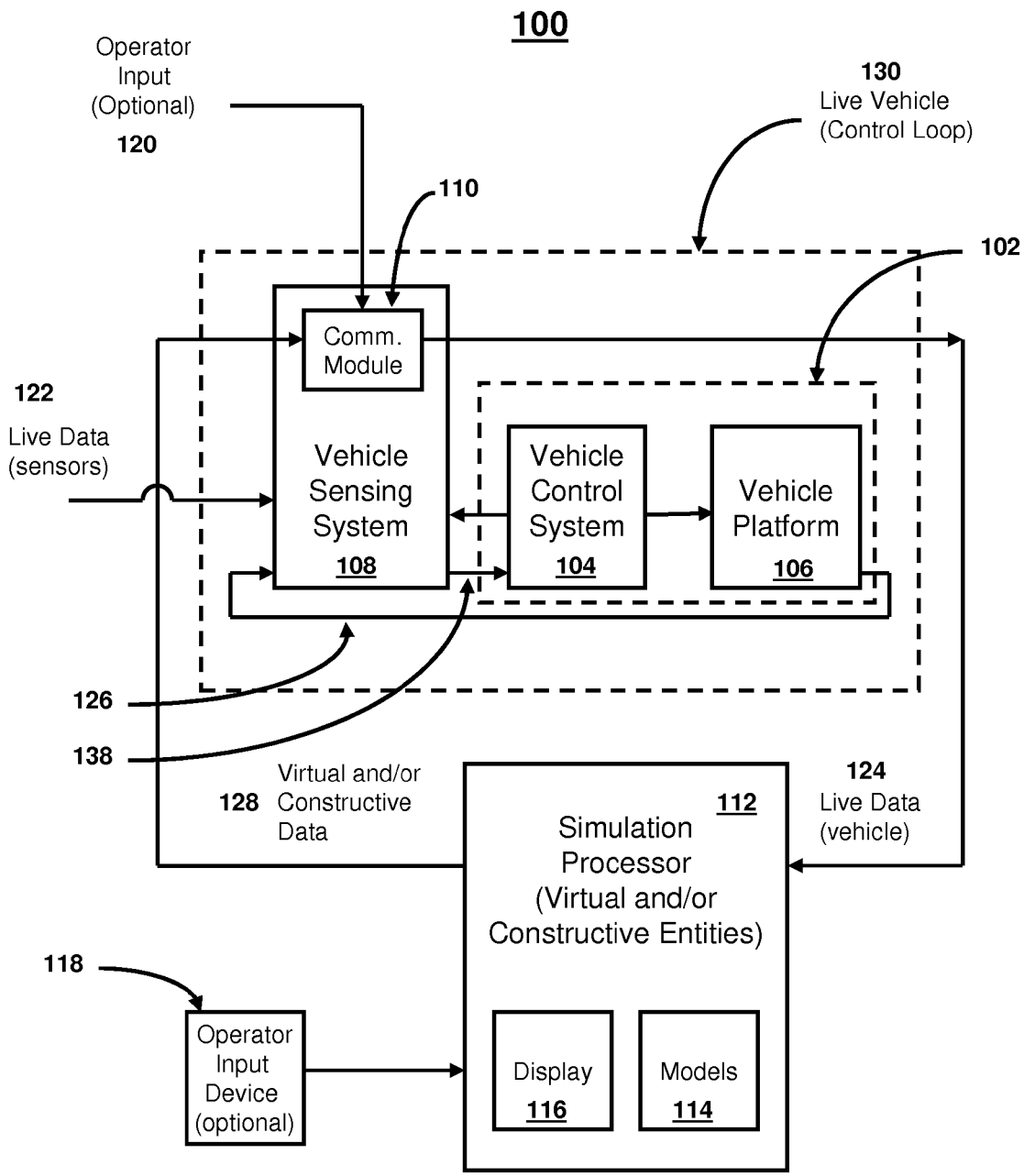
FIG. 1 is a schematic illustration of an embodiment of an apparatus according to the present invention.

FIG. 1 is a schematic illustration of an embodiment of an apparatus 100 according to the present invention. Given a robotic vehicle 102 comprising a vehicle control system 104 and a vehicle platform 106, a vehicle sensing system 108 is attached to the vehicle 102 and communicates (e.g. via an RS232 link) to the vehicle control system 104 and platform 106. The vehicle sensing system 108 can comprise a self sufficient package that can be attached to and carried by the robotic vehicle 102. The vehicle sensing system 108 includes a communications module 110 (e.g. radio link) that serves as the primary point of communication between the robotic vehicle 102 as it traverses the live environment, and a simulation processor 112 (e.g. computer) and an optional operator input device 118. The robotic vehicle 102 is operated in a live (e.g. real) environment either autonomously or optionally with operator intervention via the operator input device 118.

The live environment can include any setting suitable for emulating the expected operating environment of the vehicle, for example a test track, an indoor setting, an urban setting etc. The real environment can include obstacles, buildings, live players and other operating equipment interacting with and affecting the operation of the robotic vehicle in the real environment. The real environment can be augmented with virtual and constructive entities to create a mixed reality environment for simulating and testing a vehicles operational capability.

The simulation processor 112 can comprise a data flow based simulation application running on a personal computer. An example of a data flow based simulation application for modeling interactions between entities is found in commonly owned U.S. Pat. No. 7,085,694 herein incorporated in its entirety by reference. An operator can interact with the simulation (e.g. control the operation of the robotic vehicle 102) by means of an (optional) operator input device 118 and can view the progress of the simulation by means of a display 116 connected to the simulation processor 112. The operator input device 118 can be used for teleoperation of a robotic vehicle 102, but is not required to be present for example, when a robotic vehicle 102 is operating in an autonomous mode such as navigating by visual servoing or waypoint control (see below). Within the simulation framework, CAD (computer aided design) models 114 are joined with physics based executable models for the robotic vehicle 102 and the other entities (virtual and/or constructive) that are to be part of the simulated exercise. The actions and interactions of all entities within the mixed reality environment are simulated within the simulation processor 112.

To create the mixed reality environment the simulation processor creates a three-dimensional representation of the live environment to act as a common space for virtual and constructive objects and representations of real objects to co-inhabit. The simulation processor uses a global positioning system (GPS) based coordinate system so that object positions and orientations in the mixed reality world correspond to GPS coordinates and compass headings in the live world. The vehicle is represented within this mixed reality environment by a CAD model that is continuously updated with data from the vehicle's GPS and compass so that it mirrors the vehicles position and orientation the live world. The application then allows the vehicle to sense and interact with other objects in the virtual space by means of virtual cameras and other virtual sensors. Representing live and virtual objects together under this common framework makes it possible for them to interact as if they were part of the same world. The result is a system that allows training and testing of live vehicles within scenarios that are augmented with virtual objects and characters. At the same time, the system enhances three-dimensional simulations by allowing them to incorporate real vehicles.

Figure 2:
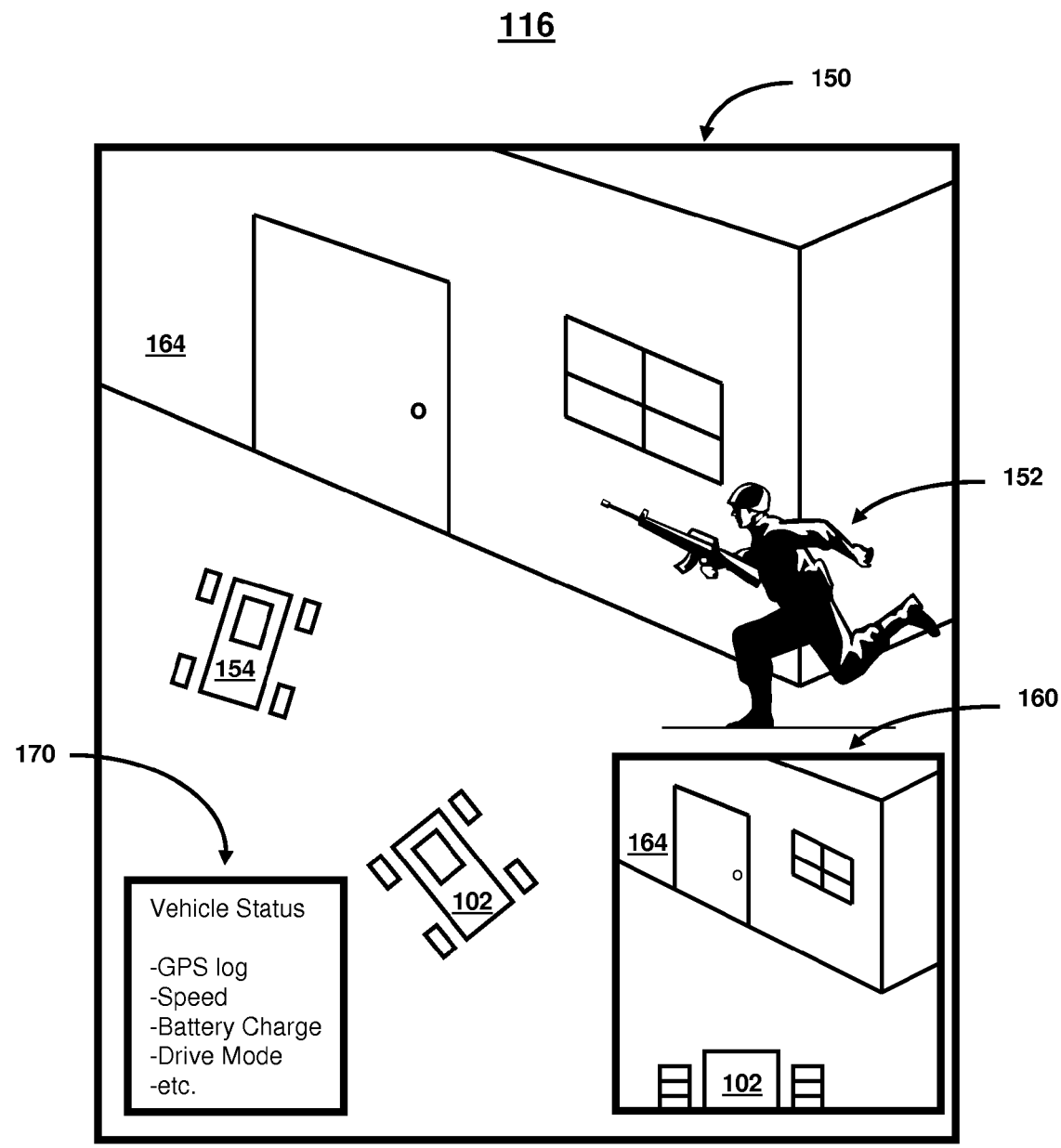
FIG. 2 is a schematic illustration of a display device having a simultaneous display of a live environment, and a corresponding mixed reality environment according to the present invention.

FIG. 2 is a schematic illustration of a display device having a simultaneous display of a live environment, and a corresponding mixed reality environment. The display 116 provides an operator with a three dimensional visualization of the robotic vehicle 102 operating within the mixed reality environment 150 (e.g. live-virtual-constructive environment) and can include a live video display 160, e.g. displaying the scene in the live environment as viewed from a camera mounted on the robotic vehicle 102. The display 116 can include a portion 170 for displaying operator selectable data relating to the stats of the robotic vehicle, for example, a GPS log, vehicle speed, battery charge, drive mode, etc.

The display of the mixed reality environment 150 can include virtual entities 152 such as a human brought into the simulation by a telepresence from a remote location and constructive entities 154 representing for example, a second robotic vehicle brought into the simulation by purely constructive means. The mixed reality environment 150 additionally includes live entities 164, such as the presence of a building observed by the camera mounted to the robotic vehicle 102.

The operator input device 118 can be in the form of a joy-stick controller or gamepad as commonly used in the art and can be used to control all operations of the vehicle if desired. It has been found in practice that few if any operations (e.g. such as downloading vehicle GPS logs) might require the use of an additional input device such as a mouse or keyboard.

As illustrated in FIG. 1, the simulation processor 112 communicates directly with the standalone vehicle sensing system 108 that rides on the robotic vehicle 102. The vehicle sensing system 108 has its own internal battery power supply and contains all the hardware and sensors (e.g. camera, compass, GPS, radio etc.) used by the live-virtual-constructive simulation system 112. It can be attached to the robotic vehicle of interest (e.g. terrestrial, aerial, aquatic) and can be interfaced to the vehicle control system 104 and vehicle platform 106 through convention communication protocols such as RS-232, which the vehicle sensing system 108 can use to tap into the vehicles motor controllers.

Figure 3:
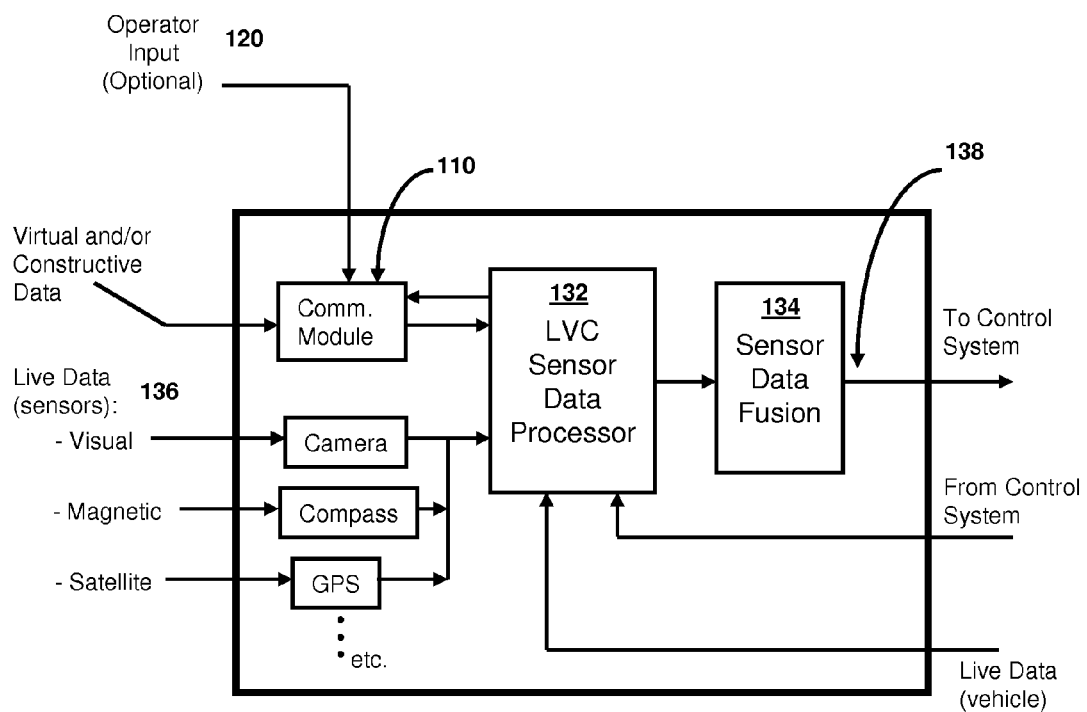
FIG. 3 is a schematic illustration of an embodiment of a vehicle sensing system according to the present invention.

As illustrated in FIG. 3, the vehicle sensing system 108 can include a communications module 110, such as a 900 MHz wireless ethernet radio, for communication with the simulation processor 112, a live-virtual-constructive (LVC) sensor data processor 132 and sensor data fusion module 134. The components of the vehicle sensing system can be interconnected by an Ethernet network. Audio and video from the robotic vehicle can be compressed prior to streaming the data to the simulation processor 112 via the communications module 110. Data from live sensors 136 such as cameras, GPS receivers and electronic compasses is also streamed to the simulation processor 112 via the communications module 110. In return, the simulation processor 112 streams virtual and constructive data and operator commands to the vehicle 102 for example, to provide differential GPS corrections and to control pan and tilt, camera zoom level and drive the vehicles motors.

The robotic vehicle is driven by a control system that is implemented as a control loop. The vehicle and the operational environment provide information to the vehicle sensing system 108 including a suite of sensors 136 to detect the operational parameters of the robotic vehicle (e.g. acceleration, attitude and operational state). The sensors feed the data to the LVC sensor data processor 132 which in turn, commands (e.g. via the integrated control command 138) the robot to perform its operation. Sophisticated robots work independently without operator input through autonomous functions of the vehicle sensing system, requiring operator input only for higher level, task-based commands. Task-based commands can include for example, commands for visual servoing, waypoint navigation, building search/exploration, perimeter security and formation maneuvers.

The data processor 132 and data fusion module 134 operate to combine (e.g. fuse) the live data 136 from sensors such as camera, electronic compass and GPS, with virtual and constructive data from the simulation processor 112, and operator inputs if present, to generate an integrated (i.e. modified/combined) control command 138 that is passed to the vehicle control system 104. Sensor data can be used for example, to avoid obstacles, identify destinations, or follow a road. These behaviors augment the operator's input to shape the vehicle's motion. For example, the vehicle accepts the operators input for speed, but can modify the direction to go around a sensed obstacle. With this process, simulated obstacles/sensors are used to provide data to the live system's sensor fusion algorithms identically to data that the actual sensor would provide. The integrated control command 138 includes the interaction of the robotic vehicle 102 with live 164, virtual 152 and constructive 154 entities within the mixed reality environment 150, causing the robotic vehicle 102 operating within the live environment 160, to emulate the operation of the robotic vehicle 102 operating in the mixed reality environment 150.

Sensors 136 provide an abstraction of information about the live environment, such as pixels generated by a camera's interpretation of light or an accelerometers digitization of changes in motion. For a simulation to supply virtual and/or constructive data to the robotic vehicles control system, it must provide data at the appropriate abstraction and timeliness, a real-time constraint of the live system, and be able to be inserted into the sensing systems data fusion algorithms in lieu of live sensor data. This causes the robot to respond directly to the virtual or constructive stimulus.

Simulations performed by the simulation processor 112 include human-operated simulators and/or simulations of other entities (constructive and/or virtual) that are intended to interact with the robotic vehicle under test. The interaction with the simulation is bi-directional. Entities within the simulation supply live, virtual and/or constructive data to the robotic vehicle via the vehicle sensing system 108 to influence (e.g. modify) its operation and the robotic vehicle's live data is captured and supplied to the simulation processor to influence the operation of the entities within the simulation. By supplying data directly into the control loop of the robot, the robot's control system allows it to respond directly to simulation entities and events; there is no distinction between the robots sensing physical entities/phenomena and simulated entities/phenomena. The robotic vehicle behaves as if it were physically sensing the simulated entities.

In addition to the robot responding to simulation effects, the simulation must be stimulated by the robot in order for the simulation to respond correctly to the robot. In this way, the live-virtual-constructive exercise is an interdependent loop of information flow. The robot is represented within the simulations (whether a virtual or constructive system) with a model that corresponds to the Live robot's physical behavior. The numeric representation of the robot, termed the "stealth" or "avatar" of the robot, is of sufficient fidelity to stimulate the simulation appropriately to the study being done. As an example, a geometric representation is needed to determine collisions within the simulation; communication models must reflect the position, power and load of the robots radio, etc. The data to be collected includes information such as position and attitude, speed, operation state, communication events, sensor events, etc. All of these can be made useful in the simulation and apply to the overall performance of the complete system of system with the Live system's performance captured.

An example of an operation of the vehicle 102 that can be evaluated and simulated in the mixed reality environment can include radio communications with a constructive robotic vehicle 154, as for example with the constructive vehicle 154 passing behind a building 164 and out of line of sight from the vehicle 102. Models 114 as known in the art, including models of the communications path between the live vehicle 102 and the constructive vehicle 154, can predict a loss of communications between the vehicles and perhaps a dropped video feed, i.e. live vehicle 102 can no longer "see" what is behind building 164 as communications with constructive vehicle 154 are lost as it passes behind building 164. The operation of the robotic vehicle 102 via the integrated control command 138 could for example, be modified to stop the vehicle 102 and entering a search mode for the "lost" vehicle 154.

Another example of operating the robotic vehicle 102 in the mixed reality environment is visual servoing. In a visual servoing operating mode, an operator can select, e.g. via operator input device 118, a feature in the mixed reality environment, such as a live, constructive 154 or virtual entity 152 and designate the feature for visual servoing. The robotic vehicle 102 will then begin continuously tracking and servoing on the selected feature. In the case of constructive 154 and virtual entities 152, the robotic vehicle will begin tracking (i.e. following) the constructive and/or virtual entity in the mixed reality environment through motions controlled by the integrated command. The motion of the robotic vehicle in the live environment will emulate the search of the objects that exist in the mixed reality environment. Visual servoing can occur in two operator selectable modes, either by fixing the gaze of the camera on the selected feature and allowing the operator to continue to control the mobility of the vehicle, or by controlling the mobility of the vehicle to follow or track the selected object. The later can be done in a completely autonomous mode, with the robotic vehicle tracking the selected feature with no further input from the operator.

Another example of operating the robotic vehicle 102 in the mixed reality environment 150 is through waypoint navigation, again selectable by an operator using an operator input device 118. An operator can designate waypoints (e.g. GPS locations) in the mixed reality view corresponding to a particular location or a path comprising a plurality of waypoints and commanding the robotic vehicle to go to the waypoint or follow the path.

A further example of operating the robotic vehicle 102 in the mixed reality environment includes immersion into a simulated environment. While operating a live robotic vehicle, the operator commands a vehicle to move in such a way as to come into collision with a simulated obstacle, the vehicle would stop. Or, if equipped with avoidance sensing capabilities, would automatically adjust the vehicle's trajectory to avoid the obstacle. If the vehicle were to travel into an area where the simulation indicates sand or mud, the vehicle's performance would be degraded appropriately to reflect the change in its ability to traverse the simulated surface.

A yet further example of operating the robotic vehicle 102 in the mixed reality environment includes operator training for robotic vehicles. In a training scenario, the operator would be presented with views from both the live camera and a view within the virtual environment. In this way, constructive items of interest could be placed within the simulation. The operator's mission would be to find and categorize these items of interest. Alternatively, the operator could be given a perimeter patrol mission about a physical facility. The patrol could involve many robots, both live and constructive. Constructive threats could be placed within the simulation scenario, and the operator's training would involve not only operating the robotic vehicle, but also the ability to orchestrate multiple entities to analyze the threat.

The above described exemplary embodiments present several variants of the invention but do not limit the scope of the invention. Those skilled in the art will appreciate that the present invention can be implemented in other equivalent ways. For example, the various modules and their functionality that make up the embodiments described above can be realized in many varied combinations of hardware and/or software. The actual scope of the invention is intended to be defined in the following claims.

What is claimed is:

1. An apparatus for modifying an operation of a robotic vehicle operating in a real environment, to emulate the operation of the robotic vehicle operating in a mixed reality environment, the robotic vehicle including a vehicle control system and a platform, the apparatus comprising:

a vehicle sensing system including a communications module, the vehicle sensing system operatively connected to the vehicle control system and the platform, the vehicle control system operatively arranged to control the operation of the platform in response to an integrated control command, the vehicle sensing system operatively arranged to sense live data corresponding to the live environment within which the robotic vehicle is operating and generate the integrated control command based upon a combination of the live data with virtual data and constructive data;

a simulation controller in communication with the communications module, the simulation controller operatively arranged to receive live data corresponding to the operation of the robotic vehicle in the live environment and simulate the operation of the robotic vehicle in the mixed reality environment, the simulation controller further operatively arranged to simulate actions corresponding to one or more selected from a virtual entity and a constructive entity operating respectively in a virtual environment and a constructive environment, the virtual and the constructive environments corresponding to the live environment, the results of said simulations comprising virtual data corresponding to the actions of virtual entities operating within the virtual environment and constructive data corresponding to the actions of constructive entities operating within the constructive environment, the simulation controller operatively arranged to communicate the virtual data and the constructive data to the vehicle sensing system.

2. The apparatus of claim 1 wherein the robotic vehicle comprises an autonomous robotic vehicle.

3. The apparatus of claim 1 further comprising an operator control input device connected to the simulation processor, the operator control input device operatively arranged to provide operator control data to the vehicle control system and the vehicle control system further operatively arranged to generate the integrated control command based upon a combination of the operator control data, the live data, the virtual data and the constructive data.

4. The apparatus of claim 3 wherein the operator control data comprises a high level task command.

5. The apparatus of claim 1 wherein the vehicle sensing system comprises one or more selected from a visual camera sensor, a magnetic compass sensor, and a global position system (GPS) sensor.

6. The apparatus of claim 1 wherein the virtual data comprises virtual data corresponding to a live entity operating in a second live environment, the second live environment physically separated from the live environment within which the robotic vehicle is operating.

7. The apparatus of claim 1 wherein the vehicle sensing system further comprises a collision detection processor, the collision detection processor operatively arranged to determine the occurrence of collisions between the robotic vehicle operating within the mixed reality environment and the one or more virtual and constructive entities.

8. The apparatus of claim 6 wherein the live entity consists of one or more live entities selected from a second live robotic vehicle entity, a live human-guided vehicle entity, and a live human entity.

9. The apparatus of claim 1 wherein the constructive entity consists of one or more selected from a constructed environmental entity, a constructed human entity and a constructed vehicle entity.

10. The apparatus of claim 1 wherein the vehicle sensing system further comprises a sensor data fusion system, the sensor data fusion system operatively arranged to combine the live data, the virtual data and the constructive data.

11. The apparatus of claim 1 wherein the simulation processor further comprises a memory module for storage of models, the models consisting of one or more models selected from a model representing the robotic vehicle, a model representing a virtual entity and a model representing a constructive entity.

12. A method for modifying an operation of a robotic vehicle operating in a real environment, to emulate the operation of the robotic vehicle operating in a mixed reality environment, the method comprising;

providing a vehicle sensing system operatively connected to the robotic vehicle, the robotic vehicle comprising a vehicle control system and a vehicle platform; providing a simulation controller in communication with the vehicle sensing system;

receiving by the simulation controller from the vehicle sensing system, live data corresponding to the operation of the robotic vehicle in the live environment, the live data consisting of one or more selected from data corresponding to the live environment within which the robotic vehicle is operating and data corresponding to the operational state of the robotic vehicle;

simulating by the simulation controller, the operation of the robotic vehicle in the mixed reality environment based upon the live data and, simulating in the mixed reality environment actions corresponding to one or more selected from a virtual entity operating in a virtual environment and a constructive entity operating in a constructive environment, the mixed reality environment comprising a combination of the live environment, the virtual environment and the constructive environment, the results of said simulating comprising virtual data corresponding to the actions of the virtual entities and constructive data corresponding to the actions of the constructive entities;

receiving by the vehicle sensing system, the live data corresponding to the live environment within which the robotic vehicle is operating and the data corresponding to the operational state of the robotic vehicle, the virtual data corresponding to the actions of virtual entities operating within the virtual environment and, the constructive data corresponding to the actions of constructive entities operating within the constructive environment; and, generating by the vehicle sensing system based upon a combination of the live data, the virtual data and the constructive data, an integrated control command for the robotic vehicle, the combination including one or more interactions within the mixed reality environment of the robotic vehicle with the one or more virtual and constructive entities, the integrated control command controlling a modified operation of the robotic vehicle in the live environment, the modified operation of the robotic vehicle in the live environment thereby emulating the operation of the robotic vehicle operating in the mixed reality environment interacting with the one or more virtual and constructive entities.

13. The method of claim 12 wherein the one or more virtual entities consist of one or more selected from a virtual human entity, and a virtual robotic entity.

14. The method of claim 12 wherein the one or more constructive entities consist of one or more selected from a constructive environmental entity, a constructive human entity, a constructive robotic entity.

15. The method of claim 12 wherein the operation of the robotic vehicle consists of one or more selected from a communications operation and a mobility operation.

16. The method of claim 12 wherein said providing a vehicle sensing system comprises providing a vehicle sensing system including one more live environmental sensors consisting of a visual camera sensor, a magnetic compass sensor, a global positioning system (GPS) sensor, a vehicle speed sensor, and a vehicle attitude sensor.

17. The method of claim 12 wherein providing a simulation controller comprises providing a simulation controller including a memory module for storage of models, the models consisting of one or more models selected from a model representing the robotic vehicle, a model representing a virtual entity and a model representing a constructive entity.

18. The method of claim 12 further comprising the steps of:
providing an operator input device operatively arranged to generate operator control data and communicate the operator control data to the vehicle sensing system; and, said step of generating further comprises,
generating by the vehicle sensing system based upon a combination of the live data, the virtual data, the constructive data and the operator control data, the integrated control command.

19. The method of claim 12 wherein the modified operation of the robotic vehicle comprises visually tracking an entity in the mixed reality environment.

20. The method of claim 19 wherein the entity consists of one or more selected from a live entity, a virtual entity and a constructive entity.

21. The method of claim 12 wherein the modified operation of the robotic vehicle further comprises emulating a mobility of the robotic vehicle in the mixed reality environment.

22. The method of claim 21 wherein the mobility of the robotic vehicle emulates the robotic vehicle encountering one or more selected from a live environmental obstacle, a virtual environmental obstacle and, a constructive environmental obstacle.

* * * * *